Figure 1:
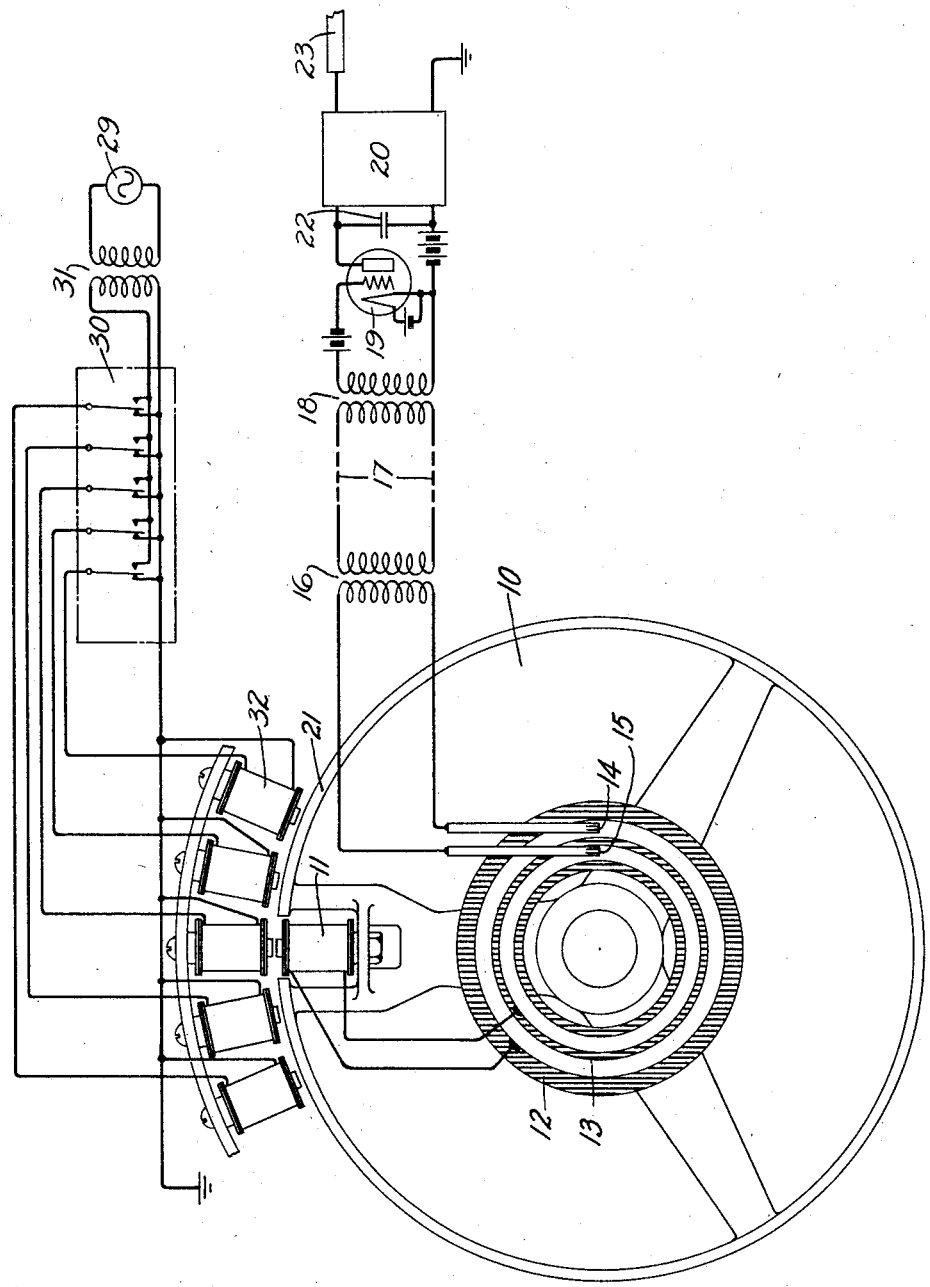

July 14, 1931.   A. A. CLOKEY ET AL   1,813,913
ROTARY DISTRIBUTOR
Filed Dec. 7, 1928   2 Sheets-Sheet 1

INVENTORS: A. A. CLOKEY
W. A. KNOOP
BY
J. W. Schmied
ATTORNEY

July 14, 1931.   A. A. CLOKEY ET AL   1,813,913
ROTARY DISTRIBUTOR
Filed Dec. 7, 1928   2 Sheets-Sheet 2

INVENTORS: *A. A. CLOKEY*
*W. A. KNOOP*
BY *J. W. Schmied*
ATTORNEY

Patented July 14, 1931

1,813,913

UNITED STATES PATENT OFFICE

ALLISON A. CLOKEY, OF RUTHERFORD, NEW JERSEY, AND WILLIAM A. KNOOP, OF HEMPSTEAD, NEW YORK, ASSIGNORS TO BELL TELEPHONE LABORATORIES, INCORPORATED, OF NEW YORK, N. Y., A CORPORATION OF NEW YORK

ROTARY DISTRIBUTOR

Application filed December 7, 1928. Serial No. 324,436.

The present invention relates to improvements in electrical signal impulse distributing apparatus and is particularly adapted for use in high speed multiplex telegraph systems operating with the Baudot or 5-unit code; however the principles of the invention are equally applicable to systems transmitting impulses in accordance with any code.

A general object is to generate signal impulses in the transmitting line or medium from a plurality of signaling circuits without the use of segmental contact devices.

A particular object of the invention is to increase the uniformity with which a rotary multiplex distributor transmits signal impulses.

Another object of the invention is to eliminate chatter and transient effects in high speed telegraph distributors.

A further object of the invention is to provide a multiplex telegraph distributing system in which the amplitude of the signal impulses impressed upon the receiving apparatus is invariable.

The sending segments of high speed multiplex telegraph apparatus cause considerable difficulty when the speed of operation is raised and when it is desired to employ a greater number of signaling channels. As the number of segments passed over by the brush is increased the time during which the brush is supposed to make contact decreases, but the chatter time becomes a larger proportion of the available contact time. As the chatter time is variable from segment to segment the height of the received signals is variable; with a large number of sending segments this variation in the amplitude of the received signal becomes troublesome.

Another cause of variation in signals in multiplex telegraphy is the wear of the brush tip. As the brush wears it bridges more and more of adjacent segments, thus electrically connecting these segments together. When these segments are of opposite polarity the sending battery is short-circuited through the protective resistances. Since the amount of this short-circuiting is variable from segment to segment this causes the received signals to vary correspondingly. For the above reasons some difficulty has been experienced in devising distributors to effectively utilize the maximum capacity of modern high speed cables.

In a system in accordance with the present invention the above mentioned difficulties are greatly reduced and higher speeds may be attained by eliminating the segments of rotary distributors. In lieu of the segments there is provided upon the distributor a magnetic pick-up coil; during the rotation of the distributor the pick-up coil sweeps past signal magnets comprising as many sets of five magnets as there are signaling channels. Instead of the usual direct current transmitter battery there may be provided in this system a source of alternating current the frequency of which is high compared with the highest frequency to be received. A suitable transmitter such as a tape transmitter, for instance, applies to the signal magnets connected to the transmitting contacts, either this high frequency current or no current, depending upon whether the contact in question is set for spacing or for marking. The contacts of half the transmitters apply the high frequency current for spacing and not for marking, while the contacts of the other half apply the high frequency current for marking and not for spacing. The alternating current passing through the signal magnets produces an alternating magnetic field in their neighborhood and the pick-up coil has induced in it a corresponding alternating voltage when it approaches a "live" magnet and no voltage when it passes in the neighborhood of a signaling magnet not traversed by alternating current. The voltage produced in the pick-up coil is transmitted to the ring collectors of the distributor and thence fed into a demodulator and from thence the demodulated signal is passed to a vacuum tube transmitter.

A distinctive feature of the invention is an electromagnetic distributor and such a device is of general application in any situation where segmented distributors have customarily been used.

Figure 2:
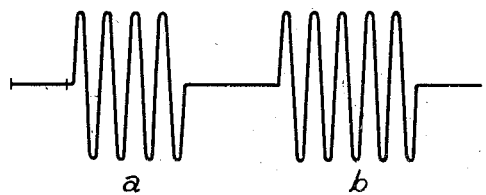
Figure 2A:
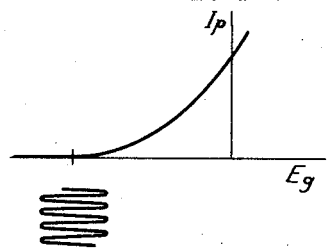
Figure 2B:
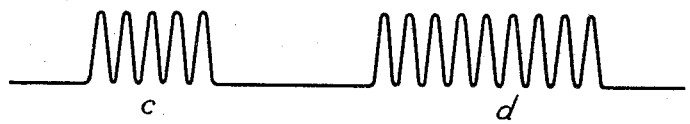
Figure 2C:
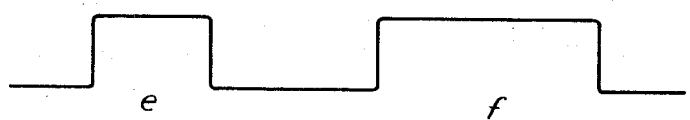

A particular embodiment of the present invention will be described herein in conjunction with the accompanying drawings; in which Fig. 1 represents a circuit diagram of one method of practicing the invention;

Figs. 2, 2—A, 2—B, and 2—C are details illustrating the action of the demodulator 19 of Fig. 1.

In Fig. 1 there is shown a rotary distributor 10. Instead of the usual segments, this distributor has stationary signal magnets 32 which are mounted around its circumference and spaced therefrom, and instead of the usual contact brush it has mounted upon it a pick-up coil 11. The winding of coil 11 is connected to slip rings 12 and 13, respectively, establishing a circuit through wipers 14 and 15 through transformer 16, line 17, transformer 18, with the input side of negative grid demodulator 19. Demodulator 19 is connected to a vacuum tube transmitter 20, which may preferably be one of those disclosed in Burton's U. S. patent applications Serial No. 282,381, filed June 2, 1928 or Serial No. 293,-772, filed July 18, 1928 or in Osborne U. S. Patent 1,405,428, filed February 7, 1922. Transformer 18, negative grid demodulator 19 and vacuum tube transmitter 20 may be located at the cable terminal point, whereas the remaining portion of the apparatus may be located at any convenient point. The transformer 16 is designed to match the impedance of its input circuit to the impedance of line 17. A transmitter 30, shown conventionally as a tape controlled impulse transmitter receives carrier current, that is, alternating current of a frequency of 1000 c. p. s. or more, from source 29 through transformer 31 and its contacts are connected to the five electromagnets 32 mounted around the circumference of the rotary distributor 10 and spaced therefrom by small air gaps. A soft iron shell 21 forms the circumference of the distributor 10 except where it is broken away at the pick-up coil 11. This shell is provided for shielding the pick-up magnet from the influence of all the signal magnets except the one it sweeps past at any particular instant of time.

In the operation of this system carrier and no carrier impulses are transmitted by transmitter 30 to signal magnets 32. If carrier current is impressed upon a signal magnet, as the pick-up coil 11 sweeps past a signal magnet 32, a voltage corresponding in polarity and magnitude to the signal impulses transmitted by transmitters 30 and having a shape such as $a$ and $b$ in Fig. 2 is induced in the pick-up coil. This voltage is transmitted to the ring collectors 14 and 15 of the distributor, impressed by transformer 16 upon line 17 and by transformer 18 upon negative grid demodulator 19. The action of this demodulator is shown in Figs. 2—A to 2—C. Fig. 2—A illustrates a portion of the characteristic curve of such a device as a function of the grid potential and plate current. The signal voltage impressed upon the grid is shown at the left of the negative portion of the grid potential axis. By virtue of the negative bias of the grid, the demodulator will reproduce only the right half of the oscillations and by virtue of the rectifying action of the demodulator only the envelopes $e$ and $f$, Fig. 2—C of the oscillations $c$ and $d$, Fig. 2—B will be obtained. After being so shaped these signal impulses will be impressed upon vacuum tube transmitter 20, for transmission either to receiving apparatus or to a transmission line, such as a submarine cable 23. Condenser 22 is provided for by-passing the carrier frequency current.

Various modifications may be made in a system in accordance with the invention. By reversal of parts the device will function as a receiving distributor as well as a transmitting distributor. It is obvious that as many sets of five electromagnetic coils as there are signaling channels could be arranged around rim 21. Furthermore, a plurality of pick-up coils may be used, for instance, by arranging them along a line parallel to the axis of rotation of the rotary distributor, or in any other manner. Thus several distributors can be mounted on a single rotating shaft. Also, any source of potential may be employed instead of the transformer 31 and/or transmitter 30. The transformers 16 and 18 may be omitted. Each magnet 32 may consist of a bi-polar structure and the pick up coil 11 may consist of a similar bi-polar structure. In fact, this is the preferred arrangement thereby permitting the magnetic circuit of a coil 32 to be closed, at the instant the coils are in alignment, by the magnetic material of the core of coil 11. It is equally well understood that the principles of the invention are applicable to a variety of systems transmitting or receiving impulses in accordance with any code in which the impulses are of unit or multiples of a unit length.

From a broad aspect the invention comprises a distributor operating without contacts to distribute into a circuit impulses which are a function of impulses in a plurality of circuits, or vice versa and is not dependent upon the use of impulses of a particular character such as the impulses produce by a carrier frequency source 29 or apparatus 19, 20 of a particular character. These elements are illustrated in order to incorporate the generic features of the invention into a single complete system and typify other elements which may be used.

What is claimed is:

1. An electrical impulse distributing system characterized in this that instead of the usual segments contacting with brushes, there is provided upon the distributor face electromagnetic impulse translating means separated from the signaling impulse transmitting means by air gaps including a source of alternating current, the frequency of which is high compared with the highest frequency to be received, to control the signal impulse transmitting means.

2. An electrical impulse distributing system comprising a rotary distributor carrying means for receiving and means for translating current impulses and a plurality of means for impressing current impulses upon said current receiving means and separated therefrom by air gaps the amplitude and perodicity of the current impulses impressed upon the receiving means being invariable.

3. An electrical impulse distributing system comprising a source of current impulses, a rotatable distributor carrying impulse receiving means comprising an electromagnet, a plurality of electromagnets mounted in spaced relation with respect to said impulse receiving means in such a manner that during each rotation of said rotatable distributor there is generated in said impulse receiving means an E. M. F., the characteristics of which are determined by the polarity and magnitude of the impulses transmitted by said source of current impulses.

4. A system comprising circuit means consisting of a plurality of circuits and circuit means consisting of a single circuit and devices whereby distinguishable impulses in either of said circuit means controls the production of correspondingly distinguishable impulses in the other, including a series of electromagnets individual to each of said plurality of circuits and an electromagnet in said single circuit in combination with means for causing the series of magnets to traverse in succession the field of said electromagnet.

5. In a signal impulse distributing system, a source of high frequency current, the frequency of which is high compared with the highest essential frequency of the signal impulses, means for transmitting signals, electromagnetic means for impressing the signal impulses through an air gap to a rotatable distributor carrying electromagnetic impulse translating means, means for transmitting the impulses upon a device for obtaining the envelope of the signal impulses.

6. In combination in an electric impulse generating system, a source of alternating current of a frequency which is higher than the highest essential frequency of the signal impulses, a signal impulse transmitter, electromagnetic means for impressing said impulses to a rotatable distributor carrying electromagnetic impulse translating means, a transmitting medium, means for demodulating the signals, and means for transmitting the demodulated signal impulses to a signaling line.

7. A system in accordance with claim 1 characterized in this, that the high frequency current is of the order of one thousand cycles per second or more.

8. An electrical impulse distributing system characterized in this, that there is provided upon the distributor face a series of electromagnets for impulse translation which are separated by air-gaps from an electromagnet successively cooperating with the series of electromagnets as its sweeps by the series of electromagnets.

9. An electrical impulse distributing system comprising a rotating electromagnet for receiving current impulses, and means for impressing current impulses upon said electromagnet, said means mounted in space relation with respect to said electromagnet.

In witness whereof, we hereunto subscribe our names this 6th day of December, 1928.

ALLISON A. CLOKEY.
WILLIAM A. KNOOP.